United States Patent
Cho (10) Patent No.: US 10,507,824 B2
(45) Date of Patent: Dec. 17, 2019

(54) FAIL-SAFE CONTROL METHOD FOR HYBRID ELECTRIC VEHICLE

(71) Applicants: Hyundai Motor Company, Seoul (KR); Kia Motors Corporation, Seoul (KR)

(72) Inventor: Jin Kuk Cho, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 198 days.

(21) Appl. No.: 15/830,026

(22) Filed: Dec. 4, 2017

(65) Prior Publication Data
US 2019/0118800 A1     Apr. 25, 2019

(30) Foreign Application Priority Data
Oct. 25, 2017  (KR) .................. 10-2017-0139580

(51) Int. Cl.
| | | |
|---|---|---|
| *B60W 20/50* | (2016.01) | |
| *B60K 6/365* | (2007.10) | |
| *B60K 6/26* | (2007.10) | |
| *B60W 10/06* | (2006.01) | |
| *B60W 10/08* | (2006.01) | |
| *B60W 10/196* | (2012.01) | |

(52) U.S. Cl.
CPC .............. *B60W 20/50* (2013.01); *B60K 6/26* (2013.01); *B60K 6/365* (2013.01); *B60W 10/06* (2013.01); *B60W 10/08* (2013.01); *B60W 10/196* (2013.01); *B60W 2510/08* (2013.01); *B60W 2510/081* (2013.01); *B60W 2710/065* (2013.01); *B60W 2710/081* (2013.01)

(58) Field of Classification Search
CPC ...... B60W 20/50; B60W 10/06; B60W 10/08; B60W 10/196; B60W 2510/08; B60W 2510/081; B60W 2710/065; B60W 2710/081; B60K 6/26; B60K 6/365
See application file for complete search history.

(56) References Cited

U.S. PATENT DOCUMENTS

| | | | | |
|---|---|---|---|---|
| 2004/0077448 A1* | 4/2004 | Oshidari | ................ | B60K 6/365 475/5 |
| 2004/0084234 A1* | 5/2004 | Yatabe | ................... | B60K 6/365 180/65.235 |
| 2004/0256165 A1* | 12/2004 | Tomita | ..................... | B60K 6/26 180/65.235 |
| 2008/0207374 A1* | 8/2008 | Iwanaka | ................ | B60L 58/12 475/5 |
| 2009/0120700 A1* | 5/2009 | Fukumura | .............. | B60K 6/365 180/65.265 |
| 2009/0209382 A1* | 8/2009 | Tabata | .................. | B60W 20/12 475/5 |
| 2016/0107518 A1* | 4/2016 | Okuwaki | ............... | B60K 6/387 701/22 |
| 2018/0086331 A1* | 3/2018 | Sato | .................... | F02D 41/0215 |

* cited by examiner

*Primary Examiner* — Calvin Cheung
(74) *Attorney, Agent, or Firm* — Mintz Levin Cohn Ferris Glovsky and Popeo, P.C.; Peter F. Corless

(57) ABSTRACT

A fail-safe control method for a hybrid electric vehicle is carried out based on a power transmission system of an engine, which is used to control the speed of the engine. When one of a plurality of motor-generators of the power transmission system malfunctions, the vehicle is controlled to be driven in a limp-home mode, thereby ensuring vehicle driving reliability and preventing the vehicle from becoming inoperable.

13 Claims, 4 Drawing Sheets

FIG. 4

FAIL-SAFE CONTROL METHOD FOR HYBRID ELECTRIC VEHICLE

CROSS-REFERENCE TO RELATED APPLICATION

This application claims under 35 U.S.C. § 119(a) the benefit of Korean Patent Application No. 10-2017-0139580 filed on Oct. 25, 2017, the entire contents of which are incorporated herein by reference.

BACKGROUND

(a) Technical Field

The present disclosure relates to a fail-safe control method for a hybrid electric vehicle, more particularly, to a fail-safe control method capable of coping with a malfunction of a motor-generator of a power transmission system of an engine.

(b) Description of the Related Art

In general, a hybrid electric vehicle refers to a vehicle that uses two or more power sources, where a gas engine and a motor-generator using electrical energy are used as the power sources of the hybrid electric vehicle.

In the case of a hybrid electric vehicle that uses an engine and a motor-generator as power sources, the hybrid electric vehicle uses the motor-generator, which has relatively good low-speed torque characteristics, as a main power source at low speeds, and uses the engine, which has relatively good high-speed torque characteristics, as a main power source at high speeds. The hybrid electric vehicle stops the operation of the engine and uses only the motor-generator at low speeds, which is advantageous to promote fuel efficiency and reduction in exhaust emissions.

A power transmission system of a hybrid electric vehicle is classified into a single-mode type and a multi-mode type.

The single-mode type has an advantage in that a torque delivery device such as clutches and brakes for shift control is not necessary, but has a shortcoming in that fuel consumption is high due to deterioration of efficiency at high speeds and in that an additional torque multiplication device is required for application to a large-sized vehicle.

Since the multi-mode type has high efficiency at high speeds and is able to multiply torque autonomously, the multi-mode type can be applied to a medium- or large-sized vehicle.

Therefore, the multi-mode type is more commonly used than the single-mode type.

The power transmission system of the multi-mode type includes a plurality of planetary gear sets, a plurality of motor-generators operated as a motor and a generator, a plurality of torque delivery devices (friction elements) controlling rotary elements of the planetary gear sets, and a battery used as a power source for the motor-generators. The power transmission system of the multi-mode type has different operating mechanisms depending on the connections between the planetary gear sets, the motor-generators, and the torque delivery devices.

However, when there is a malfunction of the one of the motor-generators that operates as a generator to charge a battery with electrical energy generated therefrom or to supply the electrical energy to another motor-generator, the power of the engine cannot be used as driving power, and the battery is not charged, leading to overdischarge of the battery.

The above information disclosed in this Background section is only for enhancement of understanding of the background of the disclosure and therefore it may contain information that does not form the prior art that is already known in this country to a person of ordinary skill in the art.

SUMMARY

A fail-safe control method for a hybrid electric vehicle is carried out based on a power transmission system of an engine, which is used to control the speed of the engine. When one of a plurality of motor-generators of the power transmission system malfunctions, the vehicle is controlled to be driven in a limp-home mode, thereby ensuring vehicle driving reliability and preventing the vehicle from becoming inoperable.

In one aspect, the present disclosure provides a fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method including, upon detecting occurrence of a malfunction of the first motor-generator, determining, by a control unit, a driving mode of the vehicle before the occurrence of the malfunction, and upon determining that the driving mode of the vehicle before the occurrence of the malfunction is an electric vehicle (EV) mode for driving the vehicle using power of the second motor-generator, when the malfunction of the first motor-generator occurs, fixing a gear ratio between the engine and the second motor-generator by engaging an overdrive (OD) brake connected with the first motor-generator and operating the engine using power of the second motor-generator.

In a preferred embodiment, in operating the engine, when a revolutions per minute (RPM) of the first motor-generator falls below a predetermined value for determining whether rotation of the first motor-generator is stopped, the gear ratio between the engine and the second motor-generator may be fixed by engaging the OD brake, and when a speed of the vehicle is equal to or greater than a first reference value after the OD brake is engaged, the engine may be operated using power of the second motor-generator. If the OD brake is in an engaged state, a maximum value of driver requested torque may be limited, and when the speed of the vehicle decreases and an RPM of the engine becomes a minimum idle RPM, engagement of the OD brake may be released and the driving mode may be switched to the EV mode. When the driving mode is switched to the EV mode, the RPM of the engine may be maintained at the minimum idle RPM.

In another preferred embodiment, if the driving mode of the vehicle before the occurrence of the malfunction is an electrically variable transmission (EVT) mode for driving the vehicle in accordance with a most efficient engine operating point, when the malfunction of the first motor-generator occurs, an engine control mode may be switched to an idle mode, and an RPM of the engine may be controlled so that an RPM of the first motor-generator falls below a predetermined value for determining whether rotation of the first motor-generator is stopped. When the RPM of the first motor-generator falls below the predetermined value, the gear ratio between the engine and the second motor-generator may be fixed by engaging the OD brake. If the OD brake is in an engaged state, a maximum value of driver requested torque may be limited, and when the speed of the vehicle decreases and an RPM of the engine becomes a minimum idle RPM, engagement of the OD brake may be released and the driving mode may be switched to the EV mode. When the driving mode is switched to the EV mode, the RPM of the engine may be maintained at the minimum idle RPM.

In still another preferred embodiment, if the driving mode of the vehicle before the occurrence of the malfunction is an OD mode for driving the vehicle in a state in which the gear ratio between the engine and the second motor-generator is fixed, when the malfunction of the first motor-generator occurs, a maximum value of driver requested torque may be limited, and when a speed of the vehicle decreases and an RPM of the engine becomes a minimum idle RPM, engagement of the OD brake may be released and the driving mode may be switched to the EV mode. When the driving mode is switched to the EV mode, the RPM of the engine may be maintained at the minimum idle RPM.

In another aspect, the present disclosure provides a fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method including, upon detecting occurrence of a malfunction of the first motor-generator, determining, by a control unit, a driving mode of the vehicle before the occurrence of the malfunction, upon determining that the driving mode of the vehicle before the occurrence of the malfunction is an EVT mode for driving the vehicle in accordance with a most efficient engine operating point, when the malfunction of the first motor-generator occurs, switching an engine control mode to an idle mode having a fixed engine RPM and controlling an RPM of the engine so that an RPM of the first motor-generator falls below a predetermined value for determining whether rotation of the first motor-generator is stopped, and upon determining that the RPM of the first motor-generator is less than the predetermined value, fixing a gear ratio between the engine and the second motor-generator by engaging an OD brake connected with the first motor-generator.

In still another aspect, the present disclosure provides a fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method including, upon detecting occurrence of a malfunction of the first motor-generator, determining, by a control unit, a driving mode of the vehicle before the occurrence of the malfunction, and upon determining that the driving mode of the vehicle before the occurrence of the malfunction is an OD mode for driving the vehicle in a state in which a gear ratio between the engine and the second motor-generator is fixed, when the malfunction of the first motor-generator occurs, limiting a maximum value of driver requested torque, and when a speed of the vehicle decreases and an RPM of the engine becomes a minimum idle RPM, releasing engagement of an OD brake for fixing the gear ratio between the engine and the second motor-generator, and switching the driving mode to an EV mode.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

A power transmission system of a hybrid electric vehicle, to which a fail-safe control method for a hybrid electric vehicle according to the present disclosure is applied, will first be described with reference to FIG. 1 for better understanding of the disclosure.

Figure 1:
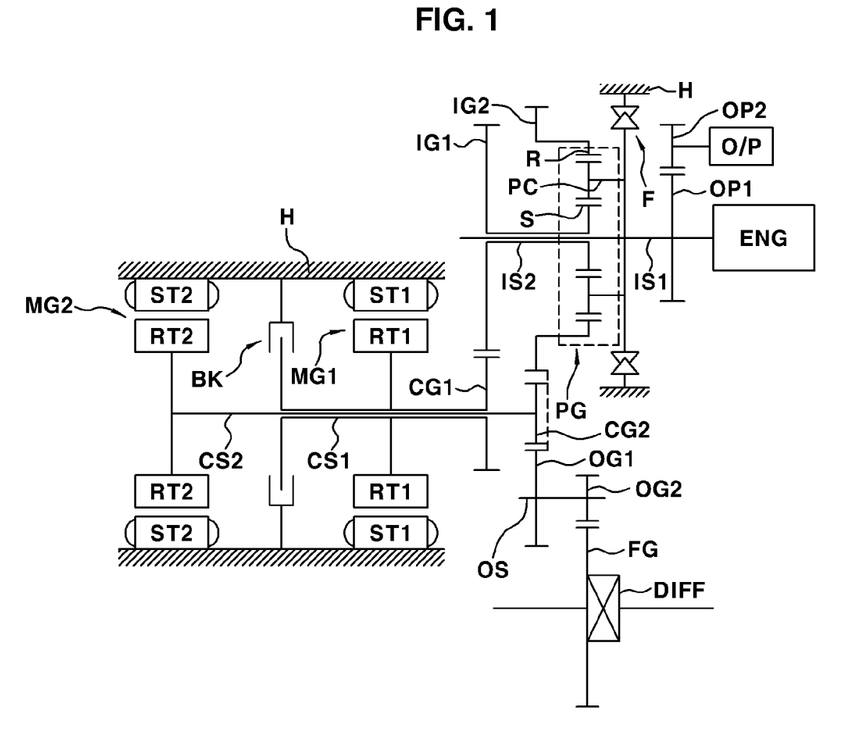
FIG. 1 is a schematic diagram illustrating the configuration of an exemplary power transmission system of a hybrid electric vehicle, to which a fail-safe control method for a hybrid electric vehicle according to the present disclosure is applied.

As shown in FIG. 1, a power transmission system of a hybrid electric vehicle uses an engine ENG, a first motor-generator MG1 and a second motor-generator MG2 as power sources, and includes an input device, a planetary gear set, a supplemental input device, a friction member, an output device, and a final reduction device.

The engine ENG is a main power source, and a gasoline engine or a diesel engine using gas or diesel fuel may be used as the engine ENG. The rotational torque generated by the engine ENG is transmitted to a transmission through the input device, and the input device may be connected to an output side of the engine ENG via a damper and a clutch, or may be directly connected to the output side of the engine ENG without disposing the damper and the clutch therebetween.

The input device includes a first input shaft IS1 and a second input shaft IS2. The first input shaft IS1 is embodied as a solid shaft and is operably connected to the engine ENG so as to receive the rotational torque of the engine ENG. The second input shaft IS2 is embodied as a hollow shaft and is disposed coaxially to and radially exterior to the first input shaft IS1 without rotational interference therebetween. A first input gear IG1 and a second input gear IG2 are disposed on the second input shaft IS2.

The planetary gear set PG is embodied as a simple planetary gear set such as a single pinion planetary gear set or a double pinion planetary gear set. In the embodiment of the present disclosure, the planetary gear set PG is exemplified as a single pinion planetary gear set.

The planetary gear set PG includes a sun gear S, a ring gear R, and a planet carrier PC supporting a plurality of pinion gears engaged with the sun gear S and the ring gear R.

The sun gear S is directly connected to a side portion of the second input shaft IS2, the planet carrier PC is directly connected to a side portion of the first input shaft IS1, and the ring gear R is directly connected to the second input gear IG2.

In addition, the planet carrier PC as well as the first input shaft IS1 are connected to a transmission housing H through a one-way clutch F so as to be prevented from rotating in an inverse direction. The first input gear IG1 is fixedly disposed at the rear end portion of the second input shaft IS2.

The supplemental input device includes first and second intermediate shafts CS1 and CS2 disposed parallel to and spaced a predetermined distance apart from the first and second input shafts IS1 and IS2. The first intermediate shaft CS1 is operably connected to the first motor-generator MG1 and the second input shaft IS2, and the second intermediate shaft CS2 is disposed coaxially to the first intermediate shaft CS1 without rotational interference therebetween and is operably connected to the second motor-generator MG2.

The first motor-generator MG1 includes a first stator ST1 fixed to the transmission housing H and a first rotor RT1 rotatably disposed inward of the first stator ST1 in the radial direction.

In addition, the first intermediate shaft CS1 connected to the first rotor RT1 is a hollow shaft, and a first intermediate gear CG1 is fixedly disposed on a front end portion of the first intermediate shaft CS1 and is engaged with the first input gear IG1. The first motor-generator MG1 may be operated as a generator by the rotational torque of the engine ENG input through the first input gear IG1. In this case, electrical energy generated by the first motor-generator MG1 is used to charge a battery (not shown) or is supplied to the second motor-generator MG2.

In addition, when the vehicle runs at a high speed or the engine is started, the first motor-generator MG1 may operate as a motor outputting an inverse driving torque.

The second motor-generator MG2 includes a second stator ST2 fixed to the transmission housing H and a second rotor RT2 rotatably disposed inward of the second stator ST2 in the radial direction.

In addition, the second intermediate shaft CS2 connected to the second rotor RT2 is a solid shaft and penetrates the first intermediate shaft CS2, and a second intermediate gear CG2 is fixedly disposed on a front end portion of the second intermediate shaft CS2. The second motor-generator MG2 is mainly operated as a motor for supplementing the driving torque for driving the vehicle, and may also be operated as a generator for transducing inertial force of the vehicle into electrical energy when the vehicle decelerates.

In addition, the friction member includes a brake BK selectively connecting the first intermediate shaft CS1 to the transmission housing H.

The brake BK is disposed between the first motor-generator MG1 and the second motor-generator MG2 and selectively connects the rear end portion of the first intermediate shaft CS1 to the transmission housing H. The brake BK may be operated in an engine direct-coupling (overdrive) mode, in which the sun gear S of the planetary gear set PG is operated as a fixed element.

The brake BK may be a multi-plate friction element that is operated by hydraulic pressure and may be controlled by a hydraulic control system (not shown).

In addition, the output device includes an output shaft OS, disposed parallel to and spaced a predetermined distance apart from the first and second input shafts IS1 and IS2, and a first output gear OG1 and a second output gear OG2, fixedly disposed respectively on both end portions of the output shaft OS.

The first output gear OG1 is engaged with the second input gear IG2 and the second intermediate gear CG2 on the second intermediate shaft CS2, and the second output gear OG2 is operably connected to the final reduction device.

The final reduction device includes a final reduction gear FG including a differential DIFF. The final reduction gear FG is engaged with the second output gear OG2 so as to finally reduce the rotational torque transmitted from the output shaft OS and transmit the reduced torque to a driving wheel through the differential DIFF.

The symbol O/P in FIG. 1 denotes an oil pump. The oil pump receives rotational torque of the first input shaft IS1 through engagement between an oil pump drive gear OP1 disposed on the first input shaft IS1 and an oil pump driven gear OP2, and produces hydraulic pressure required for the transmission.

The power transmission system of the hybrid electric vehicle configured as described above operates in an electric vehicle (EV) mode such that, in the state in which the engine ENG is stopped, the driving torque of the second motor-generator MG2 is transmitted to the final reduction gear FG of the differential DIFF via the second intermediate shaft CS2, the second intermediate gear CG2, the first output gear OG1, the output shaft OS, and the second output gear OG2.

That is, the vehicle is driven by electronic continuously variable shifting, achieved by controlling the output of the second motor-generator MG2.

In a power-split mode, the rotational torque of the engine ENG is transmitted to the driving wheel and the first motor-generator MG1 to drive the same, and the rotational torque of the second motor-generator MG2 is used as auxiliary power.

That is, the engine ENG is started by the first motor-generator MG1, and the rotational torque of the engine ENG is divided by the planetary gear set PG such that a portion of the rotational torque is transmitted to and reduced by the final reduction gear FG of the differential DIFF via the second input gear IG2, the first output gear OG1, the output shaft OS, and the second output gear OG2 and the reduced torque is transmitted to the driving wheel, such that the other portion of the rotational torque is transmitted to the first motor-generator MG1 via the second input gear IG2, the first intermediate gear CG1, and the first intermediate shaft CS1 so as to cause the first motor-generator MG1 to generate electrical energy.

The electrical energy generated by the first motor-generator MG1 is used to drive the second motor-generator MG2 or to charge a battery (not shown).

In addition, the rotational torque of the second motor-generator MG2, which is used as auxiliary power, is transmitted to and reduced by the final reduction gear FG of the differential DIFF via the second intermediate shaft CS2, the second intermediate gear CG2, the first output gear OG1, the output shaft OS, and the second output gear OG2, and the reduced torque is transmitted to the driving wheel.

In an engine direct-coupling mode (an OD mode), the brake BK is operated, and the sun gear S of the planetary gear set PG is operated as a fixed element.

In this case, the rotational torque of the engine ENG is increased by the planetary gear set PG and the increased torque is transmitted to and reduced by the final reduction gear FG of the differential DIFF via the second input gear IG2, the first output gear OG1, the output shaft OS, and the second output gear OG2, and the reduced torque is transmitted to the driving wheel.

In addition, the rotational torque of the second motor-generator MG2, which is used as auxiliary power, is transmitted to and reduced by the final reduction gear FG of the differential DIFF via the second intermediate shaft CS2, the second intermediate gear CG2, the first output gear OG1, the output shaft OS, and the second output gear OG2, and the reduced torque is transmitted to the driving wheel.

The power transmission system of the hybrid electric vehicle configured as described above may be operated in a power-split mode, in which the engine operating point is changed so that the engine can be operated with the highest efficiency, or a parallel mode, in which the gear ratio between the engine and the second motor-generator is fixed, and this may also be referred to as a power split-parallel system.

In addition, the power transmission system of the hybrid electric vehicle configured as described above distributes the torque of the engine ENG by controlling the second motor-generator MG2 and the first motor-generator MG1 using the characteristics of the planetary gear set PG. For example, in order to distribute the torque of the engine ENG to the ring gear R and the sun gear S, the first motor-generator MG1 and the second motor-generator MG2 need to perform reaction force control with respect to the output of the engine.

However, if a malfunction of the first motor-generator MG1 occurs, the torque of the engine is not normally distributed to the sun gear S and the ring gear R and thus cannot be used as power for driving the vehicle. Further, since the battery (not shown) for supplying high-voltage power cannot be charged with electrical energy, there is a risk of the battery being overdischarged.

Therefore, the present disclosure enables the vehicle to be driven in a limp-home mode, which corresponds to a fail-safe mode for safe driving when a malfunction of the first motor-generator MG1 occurs, thereby ensuring the safety of the vehicle and passengers.

In other words, when the first motor-generator MG1 malfunctions while the vehicle is running, the present disclosure maintains the operating state of the engine so that the torque of the engine can be used as power for driving the vehicle and the battery can be charged, thereby preventing the vehicle from becoming inoperable.

Hereinafter, as a fail-safe technology for ensuring the driving safety of the vehicle by coping with the occurrence of a malfunction of the first motor-generator MG1 in the power transmission system of the hybrid electric vehicle configured as illustrated in FIG. 1, a fail-safe control method of a hybrid electric vehicle according to the present disclosure will be described with reference to FIGS. 2 to 4.

Figure 2:
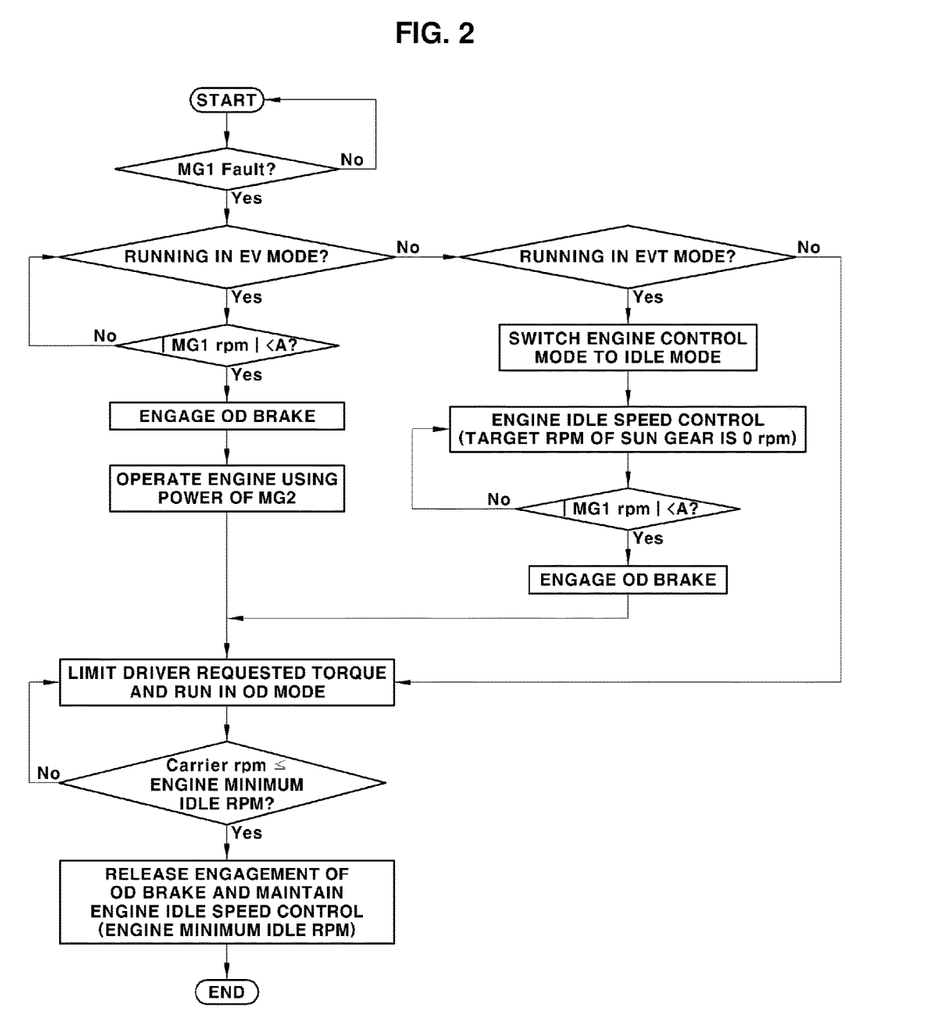
FIG. 2 is a flowchart showing the fail-safe control method for a hybrid electric vehicle according to the present disclosure.
Figure 3:
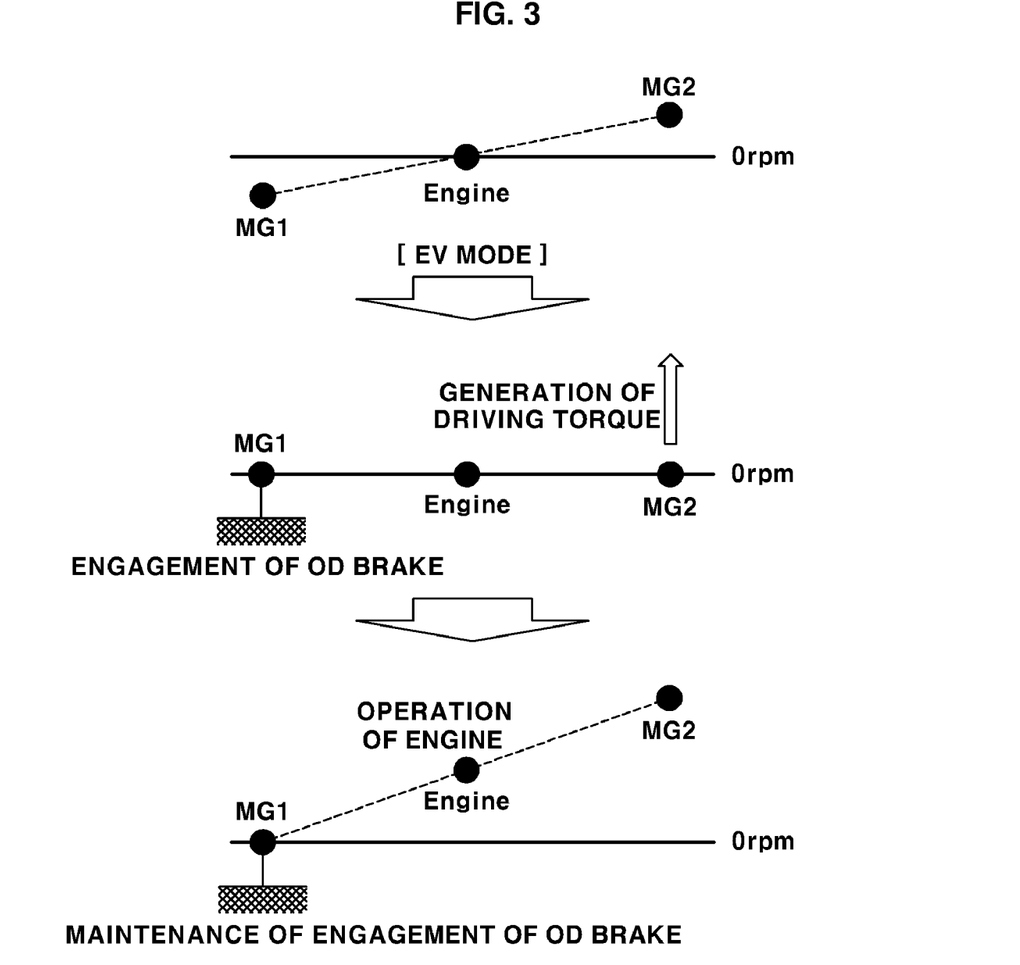
FIGS. 3 and 4 are conceptual diagrams showing the fail-safe control method according to the present disclosure for different driving modes of a hybrid electric vehicle.
Figure 4:
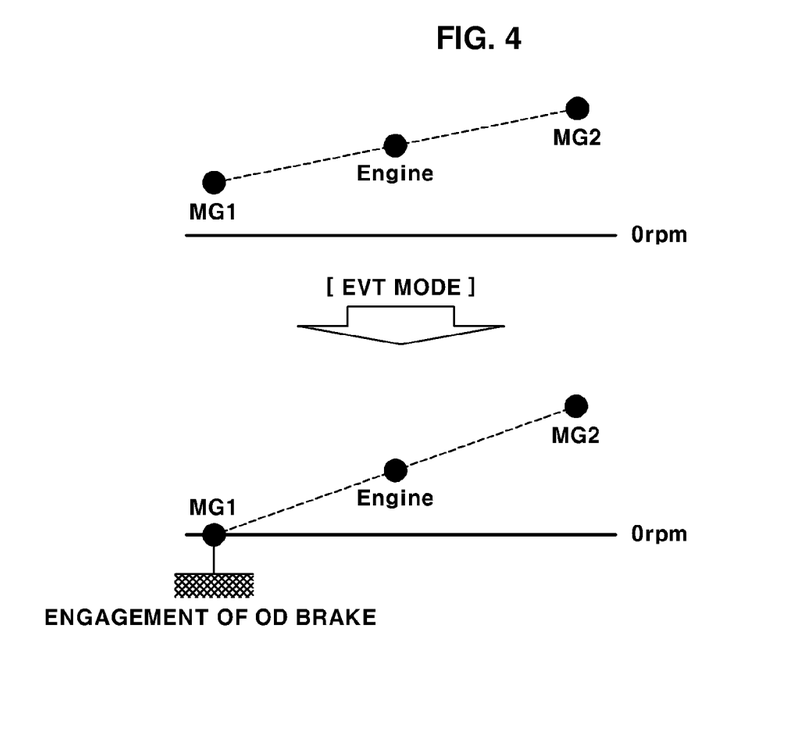

FIG. 2 is a flowchart showing the fail-safe control method for a hybrid electric vehicle according to the present disclosure, and FIGS. 3 and 4 are conceptual diagrams showing the fail-safe control method according to the present disclosure for different driving modes of a hybrid electric vehicle.

When the first motor-generator MG1 in the power transmission system of the hybrid electric vehicle configured as illustrated in FIG. 1 malfunctions, the malfunction is detected and diagnosed by a control unit mounted to the vehicle. Upon detecting the malfunction of the first motor-generator MG1, the control unit performs control such that the vehicle is driven in the limp-home mode.

As shown in FIG. 2, the control unit monitors in real time whether the first motor-generator MG1 mounted to the vehicle malfunctions while the vehicle is running.

The first motor-generator MG1 is used to operate the engine ENG and to control the speed of the engine ENG. Therefore, if a malfunction of the first motor-generator MG1 is detected, the operating state of the engine ENG should be maintained in order to prevent the vehicle from becoming inoperable. At this time, it is necessary to perform proper control based on the driving state of the vehicle just before the malfunction of the first motor-generator MG1 occurs.

Therefore, when a malfunction of the first motor-generator MG1 occurs, it is necessary to determine the diving mode of the vehicle just before the malfunction occurs.

If the driving mode of the vehicle before the occurrence of the malfunction is an electric vehicle (EV) mode using the driving torque of the second motor-generator MG2, when a malfunction of the first motor-generator MG1 occurs, the control unit stands by until the number of revolutions per minute (RPM) of the first motor-generator MG1 approaches 0 rpm and performs control of engaging the overdrive (OD) brake BK (see FIG. 3).

That is, when a malfunction of the first motor-generator MG1 occurs, it is not possible to operate the engine ENG using the first motor-generator MG1. Therefore, when the RPM of the first motor-generator MG1 falls below a predetermined value A, a gear ratio between the engine ENG and the second motor-generator MG2 is fixed by engaging the OD brake BK.

The predetermined value A is set to a value approximate to 0, based on which it can be determined that the rotation of the first motor-generator MG1 has stopped. However, the predetermined value A may vary depending on the design of the OD brake BK, for example, may be set to 500 rpm or lower.

When a lock-up is performed by engaging the OD brake BK connected to the sun gear S of the planetary gear set PG, to which the first motor-generator MG1 is connected, the gear ratio between the engine ENG and the second motor-generator MG2 is fixed at a predetermined gear ratio. This is because the first motor-generator MG1 and the second motor-generator MG2 are connected to the engine ENG via the planetary gear set PG and the second motor-generator MG2 is directly connected to the engine ENG in the overdrive (OD) mode, in which the vehicle runs in the engaged state of the OD brake BK.

The OD mode is a mode in which the gear ratio between the engine ENG and the second motor-generator MG2 is fixed at a predetermined gear ratio by engaging the OD brake BK. At this time, the predetermined gear ratio is a gear ratio that corresponds to that of an overdrive (OD) mode of a general automatic transmission.

That is, the predetermined gear ratio has a value equal to a gear ratio in an overdrive (OD) mode of a general automatic transmission.

If the speed of the vehicle increases in the engaged state of the OD brake BK, the engine ENG is operated using the power of the second motor-generator MG2.

In other words, in the case in which the OD brake BK is engaged due to the occurrence of a malfunction of the first motor-generator MG1 while the vehicle is running in the EV mode, if the speed of the vehicle increases after the engagement of the OD brake BK and reaches a speed at which the engine operation is requested, i.e., if the speed of the vehicle becomes a predetermined first reference value or higher after the engagement of the OD brake BK, the engine ENG is operated using the power of the second motor-generator MG2.

In general, a hybrid electric vehicle runs in the EV mode using the power of the second motor-generator MG2 in a low-speed driving region, which requires a relatively low driving torque, and uses the power of the engine ENG or the power of both the engine ENG and the second motor-generator MG2 in a high-speed driving region, which requires a relatively high driving torque.

Therefore, if the speed of the vehicle becomes the first reference value or higher after the engagement of the OD brake BK, the engine ENG is operated using the power of the second motor-generator MG2.

Meanwhile, if the driving mode before the malfunction of the first motor-generator MG1 occurs is an electrically variable transmission (EVT) mode, in which the vehicle runs in accordance with an optimum engine operating point, when malfunction of the first motor-generator MG1 occurs, the engine control mode is switched to an idle mode, in which the engine controls the speed autonomously, and the engine RPM is controlled so that the RPM of the first motor-generator (Specifically, the sun gear S connected to the first motor-generator MG1) falls below the predetermined value A. When the engine ENG operates in the idle mode, the engine RPM is fixed at a constant value.

When the hybrid electric vehicle employing the power transmission system configured as illustrated in FIG. 1 runs in the EVT mode, the freedom to move the engine operating point is increased, like a vehicle employing a continuous variable transmission (CVT), and particularly, is greatly increased compared to a vehicle employing a general transmission having fixed gear ratios.

Therefore, while the vehicle is running in the EVT mode, control is performed such that the engine operating point is moved so that the engine can be operated with the highest efficiency. At this time, the engine operating point is determined using brake specific fuel consumption map data and load leveling data, which are obtained through testing of an engine in a development stage of a vehicle. In other words, while the vehicle is running in the EVT mode, the engine operating point is changed so that the engine is operated at the most efficient point based on the constructed map data.

When a malfunction of the first motor-generator MG1 occurs in the EVT mode, since the engine is operating and is outputting torque, if the reaction force control with respect to the operation of the engine ENG is not performed due to the malfunction of the first motor-generator MG1, all of the torque of the engine ENG is used to increase the RPM of the engine, leading to operation of the engine ENG at a maximum RPM.

In order to prevent the engine ENG from operating at a maximum RPM, when the malfunction of the first motor-generator MG1 is detected, the engine control mode is switched from the part load mode to the idle mode, in which the RPM of the engine is controlled to a constant value. At this time, the RPM of the engine ENG is controlled so that the RPM of the first motor-generator MG1 approaches 0 rpm as closely as possible. In other words, the RPM of the engine ENG is controlled so that the RPM of the sun gear S, to which the first motor-generator MG1 is connected, falls below the predetermined value A.

The part load mode is an engine control mode that controls the output of the engine in consideration of conditions such as the amount of air that is introduced into the engine ENG, the load, etc. The predetermined value A is set to a value approximate to 0 rpm, based on which it can be determined that the rotation of the first motor-generator MG1 has stopped.

The RPM $\omega_{sun}$ of the sun gear S may be calculated from the following Equation 1, and accordingly the RPM $\omega_{carrier}$ of the planet carrier PC may be calculated from the following Equation 2.

$$\omega_{sun} = (1+R)\omega_{carrier} - R\omega_{ring} \qquad \text{Equation 1}$$

$$\omega_{carrier} = \frac{\omega_{sun} + R\omega_{ring}}{1+R} = \frac{0 + R\omega_{ring}}{1+R} = \frac{R\omega_{ring}}{1+R} \qquad \text{Equation 2}$$

Here, R is a gear ratio of the planetary gear set PG, and $\omega_{ring}$ is an RPM of the ring gear R.

In the above Equation 2, the RPM $\omega_{ring}$ of the ring gear R is determined by the driving speed of the vehicle because the ring gear R is directly connected to the second input gear IG2, which transmits torque to the driving wheel. Since the sun gear S of the planetary gear set PG is operated as a fixed element and does not rotate when the OD brake BK is engaged, the RPM $\omega_{sun}$ of the sun gear S is substituted by 0 rpm (i.e. the RPM ωsun of the sun gear S is 0 rpm), and accordingly the RPM $\omega_{carrier}$ of the planet carrier PC is calculated. Since the planet carrier PC is directly connected to the first input shaft IS1, which receives the rotational torque of the engine ENG, and the speed ratio between the planet carrier PC and the engine ENG is 1:1, the target RPM of the engine ENG is calculated. If the idle speed control of the engine ENG is performed with the calculated RPM as a target, the RPM of the first motor-generator MG1 finally falls below the predetermined value A.

If the speed control mode of the engine ENG is switched to the idle mode and the RPM of the first motor-generator MG1 falls below the predetermined value A, the OD brake BK is engaged so as to directly connect the second motor-generator MG2 to the engine ENG, thereby fixing the gear ratio between the engine ENG and the second motor-generator MG2 (refer to FIG. 4).

When the OD brake BK is engaged while the vehicle is running in the EVT mode, because the OD brake is engaged while the engine ENG is operating, the operating state of the engine ENG is maintained despite the malfunction of the first motor-generator MG1.

Through the above-described control performed in accordance with the driving mode (the EV mode or the EVT mode) of the vehicle when a malfunction of the first motor-generator MG1 occurs, the vehicle is driven under the condition that the OD brake BK is maintained in the engaged state and the engine ENG is maintained in the operating state.

The control process that is performed after the above condition is satisfied is performed identically regardless of the driving mode. That is, the same control process is performed without distinguishing between the EV mode and the EVT mode, and is also performed in the OD mode.

If the OD brake BK is in the engaged state and the engine ENG is in the operating state, that is, if the operation of the engine is maintained using the power of the second motor-generator MG2, the maximum value of driver requested torque is limited to a predetermined threshold value or lower.

The load leveling control, which is performed in order to prevent overdischarge of the battery while the vehicle is running in the OD mode, is the same as the OD mode control of the power split-parallel system. However, because the mode in which the vehicle can run when the first motor-generator MG1 malfunctions is the EV mode and the parallel mode (i.e. the OD mode), the driver requested torque in the HEV mode (the power of both the engine and the motor is used as power for driving the vehicle), in which the speed control of the engine ENG is required, is different from that in a normal driving state (in which there is no malfunction of the first motor-generator MG1).

When the load leveling control is performed, the engine ENG outputs torque while operating at a highly efficient operating point, and the remaining torque, obtained by subtracting the engine torque from the driver requested torque, is output from the second motor-generator MG2.

Because the OD mode is a driving mode that is performed to improve fuel efficiency in the high-speed and low-load driving state, torque, with respect to which the OD brake BK can perform the reaction force control, is low. Therefore, the OD brake BK cannot cover all driving modes of the power split-parallel system in accordance with driver requested torque (i.e. all driving modes including driving modes in which the torque of the engine is used as power for driving the vehicle). Therefore, when the OD brake BK is engaged when the first motor-generator MG1 malfunctions, it is necessary to set a limit on the driver requested torque.

The threshold value, to which the driver requested torque is limited, may be determined based on the gear ratio between the engine ENG and the second motor-generator MG2 when the engine ENG outputs a maximum torque and the second motor-generator MG2 outputs a maximum torque in accordance with the torque limit that the OD brake BK can handle, for example, may be set to a sum of the maximum torque of the engine ENG and the maximum torque of the second motor-generator MG2. Alternatively, the threshold value may be set to a torque value that the engine ENG outputs in order to prevent overdischarge of the battery.

While the vehicle is running in the OD mode with the driver requested torque limited to a predetermined value, if the speed of the vehicle decreases to a predetermined speed or lower, it is not possible to maintain the OD mode. If the OD mode is maintained in a low-speed region, the RPM of the planet carrier PC decreases. Accordingly, if the RPM of the planet carrier PC decreases below a minimum idle RPM of the engine ENG, the engine may stall. When the engine ENG is maintained in the operating state, the engine ENG operates at a minimum idle RPM or higher.

In order to prevent this problem, the driving mode needs to be switched to the EV mode by releasing the pressure of the oil pump O/P for maintaining the engagement of the OD brake BK. It may be possible to maintain the operating state of the engine ENG using the second motor-generator MG2 even after the engine stalls by maintaining the engagement of the OD brake BK without switching the driving mode to the EV mode. However, in this case, the engine ENG acts as a load on the second motor-generator MG2, leading to deterioration of operability and efficiency of the second motor-generator MG2.

Therefore, while the vehicle is running in the OD mode with the driver requested torque limited to a predetermined value, if the speed of the vehicle decreases to a predetermined second reference value or lower, the engagement of the OD brake BK is released, and the driving mode is switched to the EV mode. The second reference value is set to a speed value at which the RPM of the planet carrier PC becomes the minimum idle RPM of the engine ENG or lower.

If the idle RPM of the engine ENG is maintained at a high level after the driving mode is switched to the EV mode, it is difficult to switch the driving mode from the EV mode to the OD mode, which may cause overdischarge of the battery. In order to minimize this problem, when the driving mode is switched to the EV mode, the idle RPM of the engine ENG is controlled to a minimum idle RPM that the engine ENG mounted to the vehicle can realize.

In other words, while the vehicle is running in the OD mode with the driver requested torque limited to a predetermined value, if the speed of the vehicle decreases and the RPM of the planet carrier PC becomes the minimum idle RPM of the engine ENG or lower, the engagement of the OD brake BK is released, and the driving mode is switched to the EV mode. Further, when the driving mode is switched to the EV mode, the engine ENG is switched to an idle mode, and the engine RPM in the idle mode is controlled to the minimum idle RPM.

Meanwhile, when the first motor-generator MG1 malfunctions while the vehicle is running, if the driving mode of the vehicle before the occurrence of the malfunction is the OD mode, in which the gear ratio between the engine ENG and the second motor-generator MG2 is fixed, the following control process is performed in the state in which the vehicle is driven under the condition that the OD brake BK is maintained in the engaged state and the engine ENG is maintained in the operating state by the above-described control process (refer to FIG. 2), which is performed when the driving mode of the vehicle before the occurrence of the malfunction is any one of the EV mode and the EVT mode.

That is, when the first motor-generator MG1 malfunctions while the vehicle is running, if the driving mode of the vehicle before the occurrence of the malfunction is the OD mode, the maximum value of the driver requested torque is limited to a predetermined threshold value or lower. Subsequently, if the speed of the vehicle decreases and the RPM of the planet carrier PC becomes the minimum idle RPM of the engine ENG or lower, the engagement of the OD brake BK is released and the driving mode is switched to the EV mode. When the driving mode is switched to the EV mode, if the speed control mode of the engine ENG is switched to the idle mode, control is performed such that the idle RPM of the engine ENG is maintained at the minimum idle RPM.

As is apparent from the above description, the present disclosure provides a fail-safe control method for a hybrid electric vehicle, by which, even when a first motor-generator used to operate an engine malfunctions, the torque of the engine is used as power for driving the vehicle and a battery is charged with electrical energy, thereby minimizing the risk of the battery being overdischarged.

In other words, according to the present disclosure, it is possible to prevent the torque of the engine from being unable to be used as power for driving the vehicle through speed control of the engine when the first motor-generator for operating the engine malfunctions and to prevent the battery from being overdischarged due to inability to charge the battery, thereby preventing the vehicle from becoming inoperable due to malfunction of the first motor-generator and ensuring the safety of the vehicle and passengers.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method comprising:

upon detecting occurrence of a malfunction of the first motor-generator, determining, by a control unit, a driving mode of the vehicle before the occurrence of the malfunction; and upon determining that the driving mode of the vehicle before the occurrence of the malfunction is an electric vehicle (EV) mode for driving the vehicle using power of the second motor-generator, when the malfunction of the first motor-generator occurs, fixing a gear ratio between the engine and the second motor-generator by engaging an overdrive (OD) brake connected with the first motor-generator and operating the engine using power of the second motor-generator.

2. The fail-safe control method of claim 1, wherein, in operating the engine, when revolutions per minute (RPM) of the first motor-generator falls below a predetermined value for determining whether rotation of the first motor-generator is stopped, the gear ratio between the engine and the second motor-generator is fixed by engaging the OD brake.

3. The fail-safe control method of claim 2, wherein, in operating the engine, when a speed of the vehicle is equal to or greater than a first reference value after the OD brake is engaged, the engine is operated using power of the second motor-generator.

4. The fail-safe control method of claim 3, wherein, if the OD brake is in an engaged state, a maximum value of driver requested torque is limited, and wherein, when the speed of the vehicle decreases and an RPM of the engine becomes a minimum idle RPM, engagement of the OD brake is released and the driving mode is switched to the EV mode.

5. The fail-safe control method of claim 4, wherein, when the driving mode is switched to the EV mode, the RPM of the engine is maintained at the minimum idle RPM.

6. The fail-safe control method of claim 1, wherein, if the driving mode of the vehicle before the occurrence of the malfunction is an electrically variable transmission (EVT) mode for driving the vehicle in accordance with a most efficient engine operating point, when the malfunction of the first motor-generator occurs, an engine control mode is switched to an idle mode, and an RPM of the engine is controlled so that an RPM of the first motor-generator falls below a predetermined value for determining whether rotation of the first motor-generator is stopped.

7. The fail-safe control method of claim 6, wherein, when the RPM of the first motor-generator falls below the predetermined value, the gear ratio between the engine and the second motor-generator is fixed by engaging the OD brake.

8. The fail-safe control method of claim 7, wherein, if the OD brake is in an engaged state, a maximum value of driver requested torque is limited, and wherein, when a speed of the vehicle decreases and an RPM of the engine becomes a minimum idle RPM, engagement of the OD brake is released and the driving mode is switched to the EV mode.

9. The fail-safe control method of claim 8, wherein, when the driving mode is switched to the EV mode, the RPM of the engine is maintained at the minimum idle RPM.

10. The fail-safe control method of claim 1, wherein, if the driving mode of the vehicle before the occurrence of the malfunction is an OD mode for driving the vehicle in a state in which the gear ratio between the engine and the second motor-generator is fixed, when the malfunction of the first motor-generator occurs, a maximum value of driver requested torque is limited, and wherein, when a speed of the vehicle decreases and an RPM of the engine becomes a minimum idle RPM, engagement of the OD brake is released and the driving mode is switched to the EV mode.

11. The fail-safe control method of claim 10, wherein, when the driving mode is switched to the EV mode, the RPM of the engine is maintained at the minimum idle RPM.

12. A fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method comprising:

upon detecting occurrence of a malfunction of the first motor-generator, determining, by a control unit, a driving mode of the vehicle before the occurrence of the malfunction;

upon determining that the driving mode of the vehicle before the occurrence of the malfunction is an electrically variable transmission (EVT) mode for driving the vehicle in accordance with a most efficient engine operating point, when the malfunction of the first motor-generator occurs, switching an engine control mode to an idle mode having a fixed engine revolutions per minute (RPM) and controlling an RPM of the engine so that an RPM of the first motor-generator falls below a predetermined value for determining whether rotation of the first motor-generator is stopped; and upon determining that the RPM of the first motor-generator is less than the predetermined value, fixing a gear ratio between the engine and the second motor-generator by engaging an overdrive (OD) brake connected with the first motor-generator.

13. A fail-safe control method for a hybrid electric vehicle including a first motor-generator for controlling a speed of an engine, a second motor-generator for generating power for driving the vehicle, and a planetary gear set for connecting the first motor-generator and the second motor-generator to the engine, the fail-safe control method comprising:

upon detecting occurrence of a malfunction of the first motor-generator, determining, by a control unit, a driving mode of the vehicle before the occurrence of the malfunction; and upon determining that the driving mode of the vehicle before the occurrence of the malfunction is an overdrive (OD) mode for driving the vehicle in a state in which a gear ratio between the engine and the second motor-generator is fixed, when the malfunction of the first motor-generator occurs, limiting a maximum value of driver requested torque, and when a speed of the vehicle decreases and a revolutions per minute (RPM) of the engine becomes a minimum idle RPM, releasing engagement of an OD brake for fixing the gear ratio between the engine and the second motor-generator and switching the driving mode to an EV mode.

* * * * *